United States Patent [19]

Schappert et al.

[11] Patent Number: 4,739,019

[45] Date of Patent: Apr. 19, 1988

[54] CURABLE EPOXY BASED COMPOSITIONS HAVING REDUCED SHRINKAGE DURING CURE

[75] Inventors: Raymond F. Schappert, Pittsburgh; Robert M. Piccirilli, Gibsonia, both of Pa.

[73] Assignee: PPG Industries, Inc., Pittsburgh, Pa.

[21] Appl. No.: 938,923

[22] Filed: Dec. 8, 1986

[51] Int. Cl.$^4$ .................. C08L 63/02; C08L 63/04; C08L 67/02

[52] U.S. Cl. .................. 525/438; 525/533; 523/455

[58] Field of Search .................. 525/438

[56] References Cited

U.S. PATENT DOCUMENTS

| | | | |
|---|---|---|---|
| 3,723,568 | 3/1973 | Hoeschele | 260/835 |
| 3,723,569 | 5/1973 | Hoeschele | 260/835 |
| 3,793,398 | 2/1974 | Hokamura | 260/835 |
| 3,943,623 | 3/1976 | Mizutani et al. | 29/588 |
| 4,032,593 | 6/1977 | Samejima | 260/835 |
| 4,076,767 | 2/1978 | Samejima | 260/862 |
| 4,101,601 | 7/1978 | Thomas | 525/438 |
| 4,307,153 | 12/1981 | Bernelin et al. | 525/438 |
| 4,332,713 | 6/1982 | Lehmann | 156/328 |

FOREIGN PATENT DOCUMENTS

| | | | |
|---|---|---|---|
| 0666920 | 7/1963 | Canada | 525/438 |
| 0024680 | 3/1981 | European Pat. Off. | 525/438 |
| 0125906 | 11/1984 | European Pat. Off. | 525/438 |
| 56-49749 | 5/1981 | Japan | 525/438 |
| 56-104918 | 8/1981 | Japan . | |
| 58-57423 | 4/1983 | Japan . | |

OTHER PUBLICATIONS

Technical Bulletin entitled "EPON® Resin Esters for Surface Coatings", Shell Chemical Corporation, 1960, pp. 1 to 52, (pp. 28, 29, 40, 41 and 48).

*Primary Examiner*—John C. Bleutge
*Assistant Examiner*—Robert E. L. Sellers, II
*Attorney, Agent, or Firm*—Linda Pingitore

[57] ABSTRACT

A curable composition is composed of
(a) one or more epoxide group containing materials containing at least two epoxide groups per molecule;
(b) a positive amount of an effectively thermoplastic polyester, which does not react into the curable composition and is present as a blended ingredient, which does not exceed 40 percent by weight based on the total weight of the epoxide and polyester components of the composition, said polyester having a weight average molecular weight of from about 1,000 to about 8,000, being non-reactive with the one or more epoxide group containing materials and being insoluble in the one or more epoxide group containing materials of (a); and
(c) a curing agent adapted to cure the one or more epoxide group containing materials of (a).

12 Claims, No Drawings

CURABLE EPOXY BASED COMPOSITIONS HAVING REDUCED SHRINKAGE DURING CURE

BACKGROUND OF THE INVENTION

The present invention relates to epoxy resin based compositions and their use in adhesive applications.

Adhesive compositions prepared from epoxy resins exhibit a number of advantages including good strength, adhesion, corrosion resistance and suitability for formulation at high solids levels. One marked disadvantage is that epoxy based adhesives deform the substrates to which they bond because of shrinkage during cure.

In structural adhesive applications this deformation is of particular concern, especially in the automobile industry wherein the appearance of the substrate is of critical importance. This substrate deformation is not only unsightly, but it also necessitates the expenditure of additional costs in labor and materials in order to restore the intended appearance of the substrate.

There is a need, therefore, for a curable epoxy based composition which, when formulated into an adhesive, exhibits excellent physical properties but has markedly reduced shrinkage.

SUMMARY OF THE INVENTION

In accordance with the present invention there is provided a curable composition comprising:
(a) one or more epoxide group containing materials containing at least two epoxide groups per molecule;
(b) a positive amount of an effectively thermoplastic polyester, which does not react into the curable composition and is present as a blended ingredient, which does not exceed 40 percent by weight based on the total weight of the epoxide and polyester components of the composition, said polyester having a weight average molecular weight of from about 1,000 to about 8,000, being non-reactive with the one or more epoxide group containing materials and being insoluble in the one or more epoxide group containing materials of (a); and
(c) a curing agent adapted to cure the one or more epoxide group containing materials of (a).

Also provided is a method of preparing an adhesive bond between two surfaces to form a bonded structure which comprises:
I. applying to at least one of the surfaces a curable composition comprising:
  (i) one or more epoxide group containing materials containing at least two epoxide groups per molecule;
  (ii) a positive amount of an effectively thermoplastic polyester, which does not react into the curable composition and is present as a blended ingredient, which does not exceed 40 percent by weight based on the epoxide and polyester components of the composition, said polyester having a weight average molecular weight of from about 1,000 to about 8,000, being non-reactive with one or more epoxide group containing materials and being insoluble in the one or more epoxide group containing materials of (i); and
  (iii) a curing agent adapted to cure the one or more epoxide group containing materials of (i); and
II. at least partially curing the curable composition to form the bonded structure.

DETAILED DESCRIPTION OF THE INVENTION

The curable composition of the present invention comprises three principal components.

The first component is one or more epoxide group containing materials containing at least two epoxide groups per molecule. These materials are also referrd to as polyepoxides. Hydroxyl groups may also be present and often are. In general, the epoxide equivalent weight can range from about 70 to about 4,000. These polyepoxides can be saturated or unsaturated, cyclic or acyclic, aliphatic, alicyclic, aromatic or heterocyclic. They can contain substituents such as halogen, hydroxyl and ether groups.

One useful class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4-hydroxyphenyl)-2,2-propane, i.e., bisphenol A; bis(4-hydroxyphenyl)-1,1-isobutane; 4,4-dihydroxybenzophenone; bis(4-hydroxyphenol)-1,1-ethane; bis(2-hydroxyphenyl)-methane; and 1,5-hydroxynaphthalene. One very common polyepoxide is the diglycidyl ether of bisphenol A.

Another class of polyepoxides are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexanetriol, glycerol, trimethylolpropane, and bis(4-hydroxycyclohexyl)-2,2-propane.

Another class of polyepoxides are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of an olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful polyepoxides also include those containing oxyalkylene groups in the epoxy molecule. Such oxyalkylene groups have the general formula:

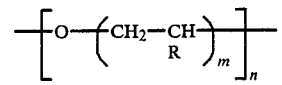

where R is hydrogen or alkyl, preferably a lower alkyl having from 1 to 6 carbon atoms, m is 1 to 4 and n is 2 to 50. Such groups are pendant to the main molecular chain of the polyepoxide or are part of the main chain itself. The proportion of oxyalkylene groups in the polyepoxide depends upon many factors, including the chain length of the oxyalkylene group, the nature of the epoxy and the degree of water solubility desired.

Another class of polyepoxides consists of the epoxy novolac resins. These resins are obtained by reacting an epihalohydrin with the condensation product of aldehyde and monohydric or polyhydric phenols. A typical example is the reaction product of epichlorohydrin with a phenol-formaldehyde condensate.

The polyepoxides can be partially defunctionalized by carboxylic acids, alcohol, water, phenols, mercaptans or other active hydrogen-containing compounds to give hydroxyl-containing polymers if desired.

As has been stated above, the curable composition can comprise more than one epoxide group containing material. Any number of epoxide group containing materials can be present in the mixture in any desired proportion.

Usually the curable composition of the present invention contains from about 60 percent by weight to about 99 percent by weight of epoxide group containing component, (a). Preferably there is present from about 70 percent by weight to about 90 percent by weight of the epoxide group containing component, the percentages being based upon the total weight of the epoxide and polyester components of the composition.

The second principal constituent of the curable composition of the present invention is an effectively thermoplastic polyester having a weight average molecular weight of less than 10,000. One very important feature of the aforesaid polyester is that it is insoluble in the one or more epoxide group containing materials. By "insoluble" is meant that the mixture of epoxide component and effectively thermoplastic polyester results in a hazy, heterogeneous phase.

By "effectively thermoplastic" is meant that the polyester is not reactive with the one or more epoxide group containing materials. Preferably the effectively thermoplastic polyester is a saturated polyester although it should be understood that these saturated polyesters can contain some percentage of unsaturated units. The amount of unsaturation can vary widely so long as the thermoplastic nature of the polyester is maintained, i.e., it does not react into the curable composition but rather is present as a blended ingredient. In one preferred embodiment the saturated polyester contains no more than about 10 percent by weight of unsaturated units, the percentage being based on the total weight of all the ingredients of the polyester.

In a further preferred embodiment, the effectively thermoplastic polyester is substantially free of aromatic units. By "substantially free" is meant that it contains no more than 10 percent by weight of aromatic units, the percentage based upon the total weight of all of the ingredients of the polyester. As used herein, an aromatic unit is intended to mean

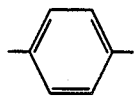

which has a molecular weight of 76. The aromatic units are generally derived from aromatic acids or anhydrides such as phthalic acid, isophthalic acid and terephthalic acid.

The effectively thermoplastic polyester generally has a weight average molecular weight of less than 10,000 although typically the polyester has a weight average molecular weight of from about 1,000 to about 8,000. Polyesters with weight average molecular weights of greater than 10,000 are not preferred because the viscosity of the curable compositions becomes too high for satisfactory application.

Molecular weight is determined by gel permeation chromatography (GPC) using a differential refractometer as the detector. The instrument is first calibrated using a polystyrene standard. Polystyrene standards used were purchased from Pressure Chemicals Company, Pittsburgh, Pa. The polystyrene standards have dispersities (dispersity=weight average molecular weight/number average molecular weight) ranging from 1.05 to 1.10. The viscosity average molecular weights of the polystyrene standards used were 900,000; 233,000; 50,000; 17,500; 4,000. To obtain a calibration curve, a set of 0.1 percent (10 milligram polystyrene/1.0 ml tetrahydrofuran) polystyrene solutions in tetrahydrofuran were prepared and a 0.5 ml sample size was injected into the columns and a GPC chromatogram was obtained. The elution volume of each peak corresponding to a given molecular weight of the polystyrene standard was measured and the data was plotted on a semilogarithmic paper (logarithm scale in the ordinate and linear scale in the abscissa). A linear least squares plot of $\log_{10}$ (molecular weight) versus elution volume in milliliters is used as a calibration curve. The lowest molecular weight of the polystyrene standard used was 4,000, and the calibration curve beyond that was extrapolated down to 100. The upper and lower exclusion limits of this set of columns are 5,000,000 and 100, respectively, in terms of polystyrene molecular weight. The sample whose molecular weights are to be determined was prepared as a 1.0 percent tetrahydrofuran solution. After filtration through a 0.5 micron filter, available from Millapore Corporation, a 0.5 ml sample size was injected into the columns and a GPC chromatogram obtained under the same experimental conditions as the calibration. From the resulting calibration curve of molecular weight versus retention time, a molecular weight relative to the standard can be assigned to the retention times of the sample. The height (H) of the curve at the corresponding retention times is recorded by the computer. From these height-molecular weight (M) combinations the following averages are calculated: weight average $$\text{molecular weight} = \frac{\Sigma H_i M_i}{\Sigma H_i}$$

This is the number reported.

Suitable polyesters are those which satisfy the aforedescribed requirements and are prepared from polyfunctional acids and polyhydric alcohols. Examples of saturated acids for preparing the preferred saturated polyesters include adipic acid, azelaic acid, sebacic acid and the anhydrides thereof where they exist. When some proportion of unsaturation is present, it is commonly introduced by the use of unsaturated polyfunctional acids such as maleic acid and fumaric acid. Commonly utilized polyhydric alcohols are ethylene glycol, propylene glycol, diethylene glycol, dipropylene glycol, butylene glycol, glycerol, trimethylolpropane, pentaerythritol and sorbital. Preferably the polyester is prepared from a diol and diacid.

The polyesters useful in the present invention are prepared by standard procedures well known in the art. One very useful procedure involves charging the diols and diacids to a reaction vessel, heating to a temperature ranging from 200° C. to 300° C. and removing the water of condensation by distillation. Care must be taken to avoid the loss of any of the reactants while removing the water since this or course will have an effect on the composition and molecular weight. Solvents such as xylene or toluene may be employed in the reaction mixture to help remove water by azeotropic distillation and an esterification catalyst such as a tin compound, for example, dibutyltin oxide or butyl stannoic acid can also be employed to increase the rate of reaction. Of course, functional derivatives of the diacids such as esters anhydrides or acid chlorides may be employed.

It should be understood that the term polyester as used herein also applies to resins which contain oil or fatty acid modification, i.e. alkyd resins.

As was mentioned above, the effectively thermoplastic polyester is present in the claimed curable compositions in a positive amount which does not exceed 40 percent by weight based on the total weight of the epoxide and polyester components of the composition. Preferably the polyester is present in an amount ranging from about 1 to about 35 percent by weight, more preferably from about 10 to about 30 percent by weight.

The third principal component, the curing agent adapted to cure the one or more epoxide group containing materials, can be selected from a variety of materials.

Suitable curing agents for the epoxide(s) include aliphatic, cycloaliphatic and aromatic polyfunctional amines; and polyamides. Examples of suitable amines include ethylene diamine, diethylene triamine, triethylene tetraamine, tetraethylene pentamine, 1,4-diaminobutane; 1,3-diaminobutane, hexamethylene diamine, 3-(N-isopropylamino) propylamine, diaminocyclohexane, and polyoxypropyleneamines commercially available under the trademark designation JEFFAMINE. Aromatic amines, although not preferred, can also be utilized herein, for example metaphenylene diamine, P,P'-methylene dianiline, and 1,4-aminonaphthalene. Also very useful herein are latent curing agents such as boron trifluoride monoethylamine complex, boron trifluoride diethylamine complex, boron trifluoride triethylamine complex, boron trifluoride pyridine complex, boron trifluoride benzyldimethylamine complex, boron trifluoride benzylamine, boron trifluoride etherate, and dicyandiamide. By latent is meant that these materials are inactive until activated by the application of heat.

Polyamides which are useful in the present compositions are those derived from fatty acids or dimerized fatty acids or polymeric fatty acids and aliphatic polyamines. For example, the materials commercially available from Henkel under the trademark designations VERSAMIDE 220 or 125 are quite useful herein.

The aforedescribed curing agent is present in the claimed curable compositions in an amount ranging from about 1 percent by weight to about 50 percent by weight, preferably from about 3 to about 15 percent by weight, the percentages being based on the total weight of the curable composition.

The curable compositions of the present invention can contain a variety of additives including pigments, reinforcements, thixotropes, plasticizers, extenders, stabilizers and antioxidants. The claimed compositions can be prepared in a number of ways either as a one-package type of composition or as a two-package composition. One package compositions can be prepared with the use of a latent curing agent.

The claimed curable compositions are typically prepared by combining the ingredients at the time immediately before use. If a one-package composition is prepared, this can be prepared in advance of use and stored. The compositions can be applied in a number of ways including spraying, extrusion, or by hand with a blade. They can be cured by allowing them to stand at ambient temperature, or a combination of ambient temperature cure and baking, or by baking alone. The compositions can be cured at ambient temperature typically in a period ranging from about 1 hour to about 48 hours, preferably from about 3 hours to about 5 hours. If ambient temperature and baking are utilized in combination, the composition is typically allowed to stand for a period of from about 5 hours to about 24 hours followed by baking at a temperature of from about 75° C. to about 200° C., preferably from about 100° C. to about 150° C., for a period of time ranging from about 20 minutes to about 1 hour.

In one further embodiment of the present invention there is provided a curable composition comprising:
(a) one or more epoxide group containing materials containing at least two epoxide groups per molecule;
(b) a positive amount of an effectively thermoplastic polyester which does not exceed 40 percent by weight based on the total weight of the epoxide and polyester components of the composition, said polyester having a number average molecular weight ranging from about 400 to about 5,000; and
(c) a curing agent adapted to cure the one or more epoxide group containing materials of (a).

The number average molecular weight is determined in the same fashion as is detailed above for weight average molecular weight determinations. Each of the components has been discussed in detail above therefore further elaboration is not deemed to be necessary.

The curable compositions of the present invention exhibit excellent physical properties and in addition have markedly reduced shrinkage. This is quite important in applications where the appearance of the substrate is critical, such as automotive applications, because the reduced shrinkage translates into substantially reduced deformation of the substrate. As a result, there is a substantial labor and cost reduction because the need for additional labor to restore the deformed substrate is markedly reduced.

Also provided by the claimed invention is a method for preparing an adhesive bond between two surfaces to form a bonded structure. The method comprises applying to at least one of the surfaces the curable composition detailed above and then at least partially curing the curable composition to form the bonded structure. Both the polymerizable composition and the mode of effecting cure have been discussed in detail above. As has been mentioned, the claimed curable composition and method are particularly applicable to structural building components of vehicles, e.g., doors, frames, hoods and the like of cars, vans, buses, and other vehicles.

The following Examples are illustrative of the invention and are not intended to limit it to their details.

EXAMPLE

In this example several adhesive compositions were prepared and evaluated as is detailed below.

| Ingredients | Compositions (parts by weight) | | | | | | | |
|---|---|---|---|---|---|---|---|---|
| | A | B | C | D | E | F | G | H |
| EPON 828[1] | 29.3 | 29.3 | 29.3 | 29.3 | 29.3 | 29.3 | 29.3 | 29.3 |
| EPON 871[2] | 15.8 | 15.8 | 15.8 | 15.8 | 15.8 | 15.8 | 15.8 | 15.8 |
| WC-68[3] | 3.6 | 3.6 | 3.6 | 3.6 | 3.6 | 3.6 | 3.6 | 3.6 |
| dicyandiamide | 4.5 | 4.5 | 4.5 | 4.5 | 4.5 | 4.5 | 4.5 | 4.5 |
| DIURON[4] | 0.8 | 0.8 | 0.8 | 0.8 | 0.8 | 0.8 | 0.8 | 0.8 |
| aluminum powder | 25.5 | 25.5 | 25.5 | 25.5 | 25.5 | 25.5 | 25.5 | 25.5 |
| milled fiberglass | 18.1 | 18.1 | 18.1 | 18.1 | 18.1 | 18.1 | 18.1 | 18.1 |
| CAB-O-SIL[5] | 2.4 | 2.4 | 2.4 | 2.4 | 2.4 | 2.4 | 2.4 | 2.4 |
| Polyester I[6] | | 6.0 | | | | | | |
| Polyester II[7] | | | 12.0 | | | | | |
| Polyester III[8] | | | | 12.0 | | | | |
| Polyester IV[9] | | | | | 12.0 | | | |
| Polyester V[10] | | | | | | 12.0 | | |
| Polyester VI[11] | | | | | | | 7.5 | |
| Polyester VI[12] | | | | | | | | 7.5 |

[1] This epoxy resin is a diglycidyl ether of bisphenol A which is commercially available from Shell Chemical Company. It has an epoxide equivalent weight of 185 to 192.
[2] This epoxy resin is a diglycidyl ether of bisphenol A which is commercially available from Shell Chemical Company. It has an epoxide equivalent weight of 390 to 470.
[3] This epoxy resin is a diglycidyl ether of neopentyl glycol which is commercially available from Wilmington Chemical.
[4] This is dimethyl dichlorophenyl urea and it is commercially available from E. I. DuPont deNemours Company.
[5] Hydrophobic fumed silica commercially available from Cabot.
[6] Polyester I: This polyester was prepared from 5.0 moles of diethylene glycol and 4.0 moles of adipic acid. It had an acid value of 8.01 and a Gardner Holdt viscosity, at 100 percent total solids, of X.
[7] Polyester II: This polyester was prepared from 5.0 moles of diethylene glycol, 2.0 moles of isophthalic acid, 2.0 moles of adipic acid and 0.1 percent butyl stannoic acid. It had an acid value of 7.98 and a Gardner Holdt Viscosity, at 100 percent total solids, of Z6.
[8] Polyester III: This polyester was prepared from 5.0 moles of diethylene glycol, 3.0 moles of isophthalic acid, 1.0 mole of adipic acid and 0.1 percent butyl stannoic acid. It had an acid value of 9.14 and a Gardner Holdt Viscosity, at 100 percent total solids, of greater than Z8.
[9] Polyester IV: This polyester was prepared from 5.0 moles of diethylene glycol, 4.0 moles of isophthalic acid and 0.1 percent butyl stannoic acid. It had an acid value of 6.71 and a Gardner Holdt viscosity, at 100 percent total solids, of greater than Z8.
[10] Polyester V: This polyester was prepared from 5.0 moles of POLYGLYCOL 4000 (This glycol had a molecular weight of 4000 and was commercially available from Union Carbide) and 4.0 moles of adipic acid. It had an acid value of 6.23 and a Gardner Holdt viscosity, at 100 percent total solids, of Y—.
[11] Polyester VI: This polyester was prepared from 5.0 moles of diethylene glycol, 1.0 mole of isophthalic acid, 3.0 moles of adipic acid and 0.1 percent butyl stannoic acid. The polyester had an acid value of 4.73 and a Gardner Holdt viscosity, at 100 percent total solids, of Z2.
[12] Polyester VII: This polyester was prepared from 5.0 moles of neopentyl glycol, and 4.0 moles of adipic acid. It had an acid value of 8.51 and a Gardner Holdt viscosity, at 100 percent total solids, of Z4—.

Each of the adhesive compositions was prepared by combining the ingredients together with mild agitation. Each composition was tested for physical properties as follows.

Lap Shear Strength: Lap shear bonds for testing were prepared using two strips of cold rolled steel (1 inch × 4 inches × 0.062 inch). A 6 mil thick film of a composition was applied onto one of the metal strips and then a second strip was placed over top of the first strip so that only one square inch strip overlapped. The composition was cured at 177° C. for 20 minutes. The lap shear strength of the bond in pounds per square inch (psi) was determined according to ASTM D-1002-65. (The ends of the strips were pulled with an INSTRON TESTER device and the lap shear strength of the bond measured.)

Flexural Strength: A panel for testing was prepared by coating a 1 inch × 6 inches × 0.031 inch metal panel with a 0.110 inch thick layer of a composition. The composition was cured by baking the panel for one hour at 177° C. and then the panel was cooled to room temperature. Flexural strength was measured in pounds by using a three point loading system utilizing center loading on a simply supported beam. That is, the panel was supported at two edges and the load was placed in the center. A load was applied at a rate of 0.2 inch per minute and the variable measured was the amount of force in pounds required to deflect the specimen a distance of 0.125 inch. Each value is an average of two separate determinations.

Tensile Strength and Tensile Modulus: A 0.100 inch thick layer of a composition was applied onto a glass panel measuring 12 inches × 12 inches × 0.100 inch. A second glass panel of the same dimensions was placed over top of this first panel and the panels were clamped together. The composition was cured by baking at 177° C. for 40 minutes and then the panels were cooled to room temperature. The clamps were removed and the free adhesive film was removed from between the panels. The free films were prepared and evaluated for tensile strength and tensile modulus according to ASTM D 638. Each value in psi is an average of two separate determinations.

Metal Deformation: A panel was prepared by applying a 1 inch × 6 inches × 0.11 inch adhesive bead onto a metal panel measuring 4 inches × 12 inches × 0.031 inch and baking at 177° C. for 20 minutes. The panel was visually observed for the amount of metal deformation which was an indication of the shrinkage of the composition.

Solubility of each Polyester in the Epoxide Component: The solubility of each of the polyesters in the epoxide component of each the compositions was determined by mixing the polyester with the epoxide component at room temperature. After the air bubbles had disappeared the clarity or haziness of the mixture was noted. A hazy mixture indicated that the polyester was insoluble in the epoxide component while a clear mixture indicated that the polyester was soluble in the epoxide component.

The results of each of the tests is recorded in Table I. As the data shows, the polyesters which were insoluble in the epoxide component gave compositions which resulted in the least amount of metal deformation. The control composition, A, which contained no polyester; and the composition F, which contained a polyester soluble in the epoxide component resulted in severe metal deformation.

TABLE I

| Compositions | Solubility of Polyester in Epoxy Component | Flexural Strength (pounds) | Lap Shear Strength | Tensile Strength (psi) | Tensile Modulus (psi) | Metal Deformation |
|---|---|---|---|---|---|---|
| A (control) | contained no polyester | 32 | 3828 | 5821 | 650504 | severe |
| B | not soluble | 24 | 3220 | 5164 | 483484 | none |
| C | not soluble | 31 | 3543 | 3874 | 554546 | very slight |
| D | not soluble | 25 | 2911 | 4513 | 422029 | none |
| E | not soluble | 33 | 2593 | 5496 | 588123 | slight |
| F | soluble | 7.2 | 329 | 800 | 163191 | severe |
| G | not soluble | 28 | 2931 | 3073 | 503869 | slight |
| H | not soluble | 24.5 | 3682 | 5502 | 564099 | slight |

What is claimed is:

1. A curable composition, comprising:
   (a) one or more epoxide group containing materials containing at least two epoxide groups per molecule;
   (b) a positive amount of an effectively thermoplastic polyester, which does not react into the curable composition and is present as a blended ingredient, which does not exceed 40 percent by weight based on the total weight of the epoxide and polyester components of the composition, said polyester having a weight average molecular weight of from about 1,000 to about 8,000, being non-reactive with the one or more epoxide group containing materials of (a) and being insoluble in the one or more epoxide group containing materials of (a); and
   (c) a curing agent adapted to cure the one or more epoxide group containing materials of (a).

2. The curable composition of claim 1 wherein the effectively thermoplastic polyester is a saturated polyester.

3. The curable composition of claim 1 wherein the thermoplastic, polyester contains no more than about 10 percent by weight of unsaturated units, the percentage based on the total weight of all of the ingredients of the polyester.

4. The curable composition of claim 2 wherein the thermoplastic, saturated polyester is substantially free of aromatic units.

5. The curable composition of claim 4 wherein the saturated polyester contains no more than about 10 percent by weight of aromatic units, the perentage based on the total weight of all of the ingredients of the polyester.

6. The curable composition of claim 1 wherein (a) is comprised of a single epoxide group containing material which is a diglycidyl ether of bisphenol A.

7. The curable composition of claim 1 wherein (a) is comprised of a mixture of two or more epoxide group containing materials.

8. The curable composition of claim 1 wherein the curing agent is an amine curing agent.

9. The curable composition of claim 8 wherein the amine curing agent is dicyandiamide.

10. The curable composition of claim 1 wherein the effectively thermoplastic polyester is present in the curable composition in an amount ranging from about 1 percent by weight to about 35 percent by weight.

11. The curable composition of claim 1 wherein the curing agent is present in the curable composition in an amount ranging from about 1 percent by weight to about 50 percent by weight, the percentages based on the total weight of the composition.

12. A curable composition, comprising:
   (a) one or more epoxide group containing materials containing at least two epoxide groups per molecule;
   (b) a positive amount of an effectively thermoplastic polyester, which does not react into the curable composition and is present as a blended ingredient, which does not exceed 40 percent by weight based on the total weight of the epoxide and polyester components of the composition, said polyester having a number average molecular weight ranging from about 400 to about 5000 and which in non-reactive with the one or more epoxide group containing materials of (a); and
   (c) a curing agent adapted to cure the one or more epoxide group containing materials of (a).

* * * * *

UNITED STATES PATENT AND TRADEMARK OFFICE
CERTIFICATE OF CORRECTION

PATENT NO.   : 4,739,019

DATED        : April 19, 1988

INVENTOR(S)  : Raymond F. Schappert et al

It is certified that error appears in the above-identified patent and that said Letters Patent is hereby corrected as shown below:

Column 10, line 45, claim 12; "in" should read "is".

Signed and Sealed this

Twenty-fifth Day of October, 1988

Attest:

DONALD J. QUIGG

*Attesting Officer*      *Commissioner of Patents and Trademarks*